Sept. 13, 1960     E. C. BERNHARDT     2,952,041
PROCESS FOR INTERMITTENT FLOW OF PLASTIC MATERIAL
Filed May 31, 1956
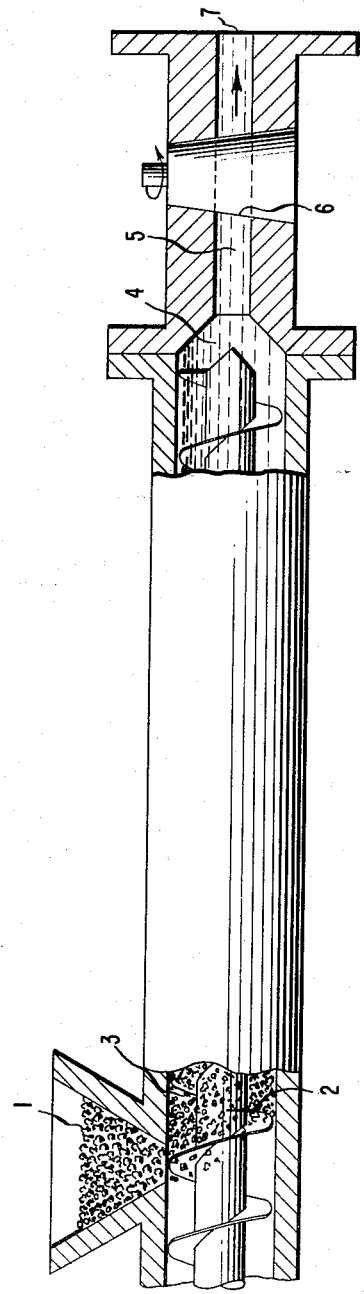
INVENTOR
ERNEST CARL BERNHARDT
BY *A. McAlevy*
ATTORNEY

2,952,041
PROCESS FOR INTERMITTENT FLOW OF PLASTIC MATERIAL

Ernest Carl Bernhardt, Wilmington, Del., assignor to E. I. du Pont de Nemours and Company, Wilmington, Del., a corporation of Delaware Filed May 31, 1956, Ser. No. 588,476

1 Claim. (Cl. 18—55)

This invention relates to a novel process for producing an intermittent flow of molten or thermally softened plastic material.

Heretofore there have been numerous devices for producing discrete "slugs," or pellets, composed of plastic material. In general, these devices included a die, or a plurality of dies, through which the plastic was caused to emerge; upon emergence, or very shortly thereafter, the plastic was severed into units of the desired size by a rotating knife or other similar mechanism, the motion of which was synchronized with the rate of flow of the emerging plastic. In those instances in which the plastic emerged from a plurality of orifices, the continuity of flow could be maintained by successively closing some of the orifices while keeping others open.

Certain advantages are, however, obtained in accordance with the present invention, by subjecting molten plastic material to an elevated pressure by means of a continuously rotating extrusion screw, while intermittently permitting emergence of the plastic from the extruder. Somewhat surprisingly, it has been found that such intermittent emergence, if performed at a rapid cycle, is not accompanied by a reduction in the overall rate of flow, or the number of "slugs" which the extruder can produce. On the other hand, such intermittent emergence, performed in rapid cycle, is accompanied by significant practical advantages, such as greater simplicity of the mechanism, and ease of relating production to a rapid-fire later operation, such as molding, stamping, or the like, which can be attuned to the same cycle. Thus, the rate of producing various objects by the process of this invention can be much more rapid than in prior art devices. For example, 60 or more objects per minute may be produced by the present invention.

The present invention eliminates the need for a ram extruder in injection molding, and thus facilitates the production of shaped objects from such thermoplastic organic materials as polyethylene or other olefin polymers or interpolymers; linear polyamides; linear polyesters; cellulose ethers and esters; polystyrene; polyvinyl chloride; polyvinyl esters; acrylic resins, etc. Rubber and synthetic elastomers may be treated in this manner also.

The maximum pressure generated within the plastic material is determined by screw design principles known in the art, and during the time when the die is closed, this pressure should not be so large as to exceed the pressure which can be retained safely by the extruder assembly. Commercial extruders can frequently withstand pressures of 7000 to 10,000 p.s.i., a suitable maximum operating pressure being about 5000 p.s.i.

The temperature of the plastic material during extrusion should, of course, not exceed the thermal decomposition temperature. At the time of passage through the orifice, the temperature of the plastic material should be sufficient to maintain the polymer in the molten state. Electric heaters may be used at the exit portion of the extruder if desired. Generally, however, the temperature gradient within the extruder is maintained at such a level that such electric heaters are not essential. During the time when the plastic material is not flowing through the orifice, as distinguished from that part of the cycle when the plastic is emerging therefrom, the temperature of the plastic at the exit end of the extruder undergoes a slight but very rapid increase, due to the mechanical work done thereon. This is noted when the number of shots per minute is relatively low, but, in general, is not otherwise readily detectable. Each such increase in temperature, according to the method of this invention, is followed by an opening of the orifice and the release of a portion of the thermoplastic material. This is made to occur, in particular embodiments, one or more times per second, but may be slowed to a less frequent number of longer shots, e.g., 3 to 4 two-ounce shots from a 2-inch extruder per minute.

The interruption of the flow of thermoplastic material from the orifice is accomplished by any suitable valve, such as a plug-valve rotating at the desired speed or a reciprocating valve element actuated by a cam or other appropriate mechanism. The time cycle depends upon the rate of flow and the size of molten slug or pellet desired. The rate of flow depends upon the design and size of the extruder in accordance with known principles.

The invention, in a specific embodiment, is illustrated further by means of the accompanying drawing which shows an extruder equipped with a feeding means 1, an extruder screw 2, which advances the plastic material 3 to the exit portion 4 where it is in a molten state. This molten or partially molten plastic escapes through the orifice 5 which is intermittently closed by the rotating plug valve 6. This produces an interrupted flow of plastic into the exit line 7. This line can in turn be used as a feed for a mold cavity, or stamping device, or other shaping means requiring periodic injection of a slug of molten or thermally softened plastic. Alternatively, the slugs can be collected as discrete units, and fed to a stamping machine or other shaping device.

EXAMPLE

In an apparatus typified by the drawing hereinabove described, polyethylene (density, .92) was ejected from the extruder at the rate of 100 shots per minute (0.3 second open for each shot) each shot weighing 1.35 grams. The variation between the weights of the shots was ±1%. Valve and extruder temperature was 450° F. (232° C.), using a screw with a channel depth of 0.110 inch in the metering section. At this extrusion temperature, polyethylene had a viscosity about equal to that of honey. Pressure varied from 800 p.s.i. to 1400 p.s.i., as between the opening and closing of the valve.

In similar trials, results were obtained as set forth in the following table.

Table
INTERMITTENT PRODUCTION OF POLYETHYLENE EXTRUDATE (TWO INCH EXTRUDER)

| Duration of Cycle (sec.) | | Screw Speed, r.p.m. | Pressure (p.s.i.) | | Wt. of Shot (grams) | Stock Temp., °F. |
|---|---|---|---|---|---|---|
| Open | Closed | | Maximum | Minimum | | |
| 1.5 | .3 | 19 | 1500 | 1100 | 1.4 | 415 |
| 1.3 | .3 | 41 | 1600 | 900 | 1.4 | 415 |
| 1.5 | .5 | 41 | 1600 | 700 | 5.7 | 410 |
| 1.5 | 1.0 | 41 | 1600 | 800 | 7.6 | 410 |
| .5 | 1.0 | 41 | 1800 | 1400 | 5.5 | 410 |

In the method of the foregoing example, rates as high as 300 shots per minute could be obtained readily. Each shot is suitably dropped into a compression mold cavity in a rotating indexing table having a multitude of such cavities. The opening and closing of the compression molds is suitably cam-actuated and coordinated with the timing of the valves. More than one valve may be used. There is no need for any variation in the screw speed, even though the flow of the plastic through the extruder is discontinuous.

The mold cavity or other shaping device may be maintained at any suitable temperature, but in many instances maximum production rates are attained by chilling the mold. The feed lines leading to the mold cavity may be lubricated, as for example by a polytetrafluoroethylene liner or graphite coating.

If desired, the process of the invention can be used in combination with a fly-knife which severs the extrudate during the interval of interrupted flow. The motion of the fly-knife can be synchronized with that of the orifice-closing means, and in this way cylindrical shapes or other shapes having two parallel sides can be made.

Plasticizers may of course be present in the plastic material. Moreover, finely divided fillers such as carbon black, colloidal silica, etc. may also be present. Blowing agents may also be included, if a foamed solid is desired.

The process and method of this invention is especially useful in manufacture of bottle caps, bottles, and other shaped objects, especially those which are of relatively small size, and which require rapid but intermittent feeding of plastic material to a shaping means.

I claim:

A method for producing an intermittent flow of plastic material, which comprises supplying molten plastic material to an orifice by the rotation of a continuously rotating extrusion screw, and intermittently interrupting the flow of molten plastic at the said orifice by means of a valve which opens and closes intermittently thus producing cycles of finite times of flow and non-flow, the said time of non-flow being at least one-fifth the said time of flow, whereby each interruption of flow causes a temperature and appreciable pressure increase at the exit portion of the extruder between the screw and the valve, thus facilitating emergence of the plastic material past said valve under the pressure generated by the said extruder directly into a shaping means.

References Cited in the file of this patent

UNITED STATES PATENTS

| | | |
|---|---|---|
| 2,359,840 | Goessling | Oct. 10, 1944 |
| 2,488,786 | Watkins | Nov. 22, 1949 |
| 2,656,569 | Watkins et al. | Oct. 27, 1953 |
| 2,734,226 | Willert | Feb. 14, 1956 |